US008474695B1

(12) United States Patent
McCoy

(10) Patent No.: US 8,474,695 B1
(45) Date of Patent: Jul. 2, 2013

(54) ATM SECURITY SYSTEM AND ASSOCIATED METHOD FOR PROTECTING PERSONAL INFORMATION DURING TRANSMISSION OF AN EMERGENCY EVENT

(76) Inventor: Jelani McCoy, Wilmington, DE (US)

( * ) Notice: Subject to any disclaimer, the term of this patent is extended or adjusted under 35 U.S.C. 154(b) by 532 days.

(21) Appl. No.: 12/770,042

(22) Filed: Apr. 29, 2010

Related U.S. Application Data

(63) Continuation-in-part of application No. 11/900,128, filed on Sep. 10, 2007, now abandoned.

(60) Provisional application No. 60/826,574, filed on Sep. 22, 2006.

(51) Int. Cl.
*G06Q 40/00* (2012.01)

(52) U.S. Cl.
USPC .......... 235/379

(58) Field of Classification Search
USPC .......... 235/379
See application file for complete search history.

(56) References Cited

U.S. PATENT DOCUMENTS

2002/0095601 A1* 7/2002 Hind et al. .......... 713/201
2003/0141372 A1* 7/2003 Brown et al. .......... 235/487
2004/0168067 A1* 8/2004 Russikoff .......... 713/183
2006/0028341 A1* 2/2006 Bartholf et al. .......... 340/570
2007/0078780 A1* 4/2007 Tran et al. .......... 705/65
2007/0200928 A1* 8/2007 O'Doherty et al. .......... 348/143

* cited by examiner

*Primary Examiner* — Michael G Lee
*Assistant Examiner* — David Tardif

(57) ABSTRACT

An ATM security system preferably a mechanism is provided for capturing and transmitting an occurrence of the emergency event to a backup server. Another mechanism is provided for determining whether a consumer granted permission to a financial institution to share the non-public personal consumer information with the policing authority upon detection of the emergency event. Yet another mechanism is provided for routing a real time output distress signal to the policing authority upon capturing the emergency event in such a manner that the policing authority receives a location, a date and a time of the emergency event. Such a real time output distress signal includes a facial image of the consumer at the emergency event. Notably, the real time output distress signal includes the non-public personal consumer information only if the consumer granted the financial institution permission to share the non-public personal consumer information before occurrence of the emergency event.

8 Claims, 3 Drawing Sheets

ATM SECURITY SYSTEM AND ASSOCIATED METHOD FOR PROTECTING PERSONAL INFORMATION DURING TRANSMISSION OF AN EMERGENCY EVENT

CROSS REFERENCE TO RELATED APPLICATIONS

This is a Continuation-in-Part Application of U.S. patent application Ser. No. 11/900,128 filed Sep. 10, 2007, currently pending, which claims the benefit of U.S. Provisional Application No. 60/826,574, filed Sep. 22, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION TECHNICAL FIELD

This invention relates to ATM security systems and, more particularly, to an ATM security system for alerting a policing authority of a emergency event occurring at the ATM while protecting a consumer's non-public personal information for unauthorized dissemination.

PRIOR ART

Automatic teller machines (ATMs) offer customers convenient access to their money 24 hours a day. At the same time, customers occupied at the ATM often become easy targets for robbers, who can steal their cash and also force them to withdraw more funds. Some communities have instituted a program that entailed installing ATM machines at police stations and despite the increasing boldness of many criminals; none has been so brazen to attempt to rob customers at police stations. Although this has proven to be an effective solution, only a very small percentage of all ATM users benefit from this approach. Obviously, it would be advantageous to provide a means for increasing the safety of ATM users.

U.S. Pat. No. 7,183,915 to Bartholf discloses a security system for use in an enclosure which may include an ATM. The security system includes a first electronic module housed within the enclosure and at least one removable container for storing valuables. A second electronic module is housed within the removable container. The modules communicate with each other wirelessly within the enclosure. The first module includes one or more inputs for receiving an output of at least one sensor for sensing an activity predetermined to indicate a security threat, a first logic circuit in communication with the inputs, and a first wireless communication device connected to the logic circuit. The second electronic module includes a second wireless communication device, a second logic circuit connected to the second communication device, and at least one output for sending an activation signal to a theft deterrent device in response to a pre-programmed sequence of events, including at least one communication from the first module. Unfortunately, this prior art example does not include a method for enabling a user to alert the police during a robbery.

U.S. Pat. No. 5,598,793 to Lopez discloses an anti-theft device for Automated Teller Machines (ATMs) that provides for the blurring or defacing of banknotes which are stored within ATM banknote cassettes/containers within the ATM upon a breach of security of the ATM. The breach of security is either a break-in attempt or the attempted removal of the entire ATM from its location. An indelible dye or ink, stored under pressure within a tank internal to the ATM unit, is caused to be released into a distribution manifold, which is integral with the banknote cassette and in communication with the interior thereof, upon receipt of an actuating signal. The actuating signal is preferably developed by an electrical device which triggers the of the distribution manifold to the tank occurs automatically without user interface when cassettes are changed. In another embodiment, the distribution manifold is separate from the cassette. When ink enters the manifold fluid pressure extends a set of nozzles to carry ink to bores drilled in the cassettes, thus requiring only minimal modification of the cassette. A swiveling extension is added to the end of the pick up tube in the pressurized ink tank. When the machine, and therefore the tank, is tilted, the swiveling extension helps extract the maximum quantity of ink possible from the tank. Unfortunately, this prior art example is not designed to alert the police of a robbery attempt.

U.S. Pat. No. 6,491,216 to May discloses a security system provided for use in association with a media entry slot on the user interface of a self service terminal, such as an automated teller machine. At least three profile sensors are arranged to detect the profile of the leading edge of an object inserted into the slot. An access control means allows objects having a leading edge profile corresponding to a predetermined profile only to access a restricted zone such as the card reader module or a depository. This arrangement reduces the risk of fraudulent access to sensitive parts of the self service terminal via the media entry slots provided on its user interface. Unfortunately, this prior art example does not include a method for enabling a user to alert the police during a robbery.

However, such prior art references fail to address the need to protect and safeguard personal information about a consumer during transmission of a robbery at an ATM machine. Many financial companies are required to ensure the preservation and confidentiality of their client's personal information. Such requirements are regulated by rules, such as those rules found in 12 C.F.R. 216. Section 216 of the code of federal regulations is sometimes referred to as Regulation P, incorporated herein by reference in its entirety.

In summary, Regulation P governs the treatment of nonpublic personal information about consumers by the financial institutions for which the Board has primary supervisory authority. A general description of the regulation, by section, follows. Section 216.1 summarizes the obligations of a financial institution to provide notice to its customers about its privacy policies and practices and the right of a consumer to prevent a financial institution from disclosing nonpublic personal information about him or her to nonaffiliated third parties by "opting out" of that disclosure. Specifies that only the U.S. offices of financial institutions for which the Board has primary supervisory authority are subject to the requirements of the regulation.

Section 216.2 states that the examples in the regulation and the sample clauses in appendix A of the regulation are not exclusive and that compliance with an example or use of a sample clause, to the extent applicable, constitutes compliance with the regulation.

Section 216.4 Initial sets forth requirements to provide an initial privacy notice to a customer not later than when the financial institution establishes a customer relationship, and to a consumer before disclosing any nonpublic personal information about the consumer to any nonaffiliated third party, subject to certain exceptions. Also provides an exception to allow subsequent delivery of an initial notice under limited circumstances.

Section 216.7 establishes the items of information required to be described in the opt-out notice and sets forth requirements for providing a reasonable opportunity to opt out to consumers who jointly obtain a financial product or service.

Section 216.8 sets forth requirement to provide a revised privacy notice to a consumer before disclosing nonpublic personal information about him or her to a nonaffiliated third party other than as described in the initial notice to the consumer.

Section 216.10 establishes the general limitation against disclosing nonpublic personal information about a consumer to any nonaffiliated third party.

Accordingly, the present invention is disclosed in order to overcome the above-noted shortcomings. The present invention satisfies such a need by providing a system that is convenient and easy to use, is versatile in its applications, is easily installed, and provides an innovative and creative crime prevention technique which could be instrumental in reducing ATM robberies and other crimes. Such a system is most useful in helping police fight crime problems within the community and most beneficial for all law-abiding citizens. Moreover, the ATM security system ensures non-public personal consumer information is maintained in private and confidential manner without unnecessarily disclosing such sensitive information during an emergency event.

BRIEF SUMMARY OF THE INVENTION

In view of the foregoing background, it is therefore an object of the present invention to provide an ATM security system is provided for alerting a policing authority of a emergency event occurring at the ATM while ensuring preservation of non-public personal consumer information involved in the emergency event.

Such an ATM security system preferably includes a housing including a controller disposed therein. Such a housing is preferably adapted to reside at the ATM. A backup server is preferably in communication with the controller. A mechanism is provided for capturing and transmitting an occurrence of the emergency event to the backup server, the capturing and transmitting means being disposed within the housing. A policing authority may be remotely located from the housing and another mechanism is provided for determining whether a consumer granted permission to a financial institution to share the non-public personal consumer information with the policing authority upon detection of the emergency event.

The ATM security system may further include yet another mechanism for routing a real time output distress signal to the policing authority upon capturing the emergency event in such a manner that the policing authority receives a location, a date and a time of the emergency event. Such a real time output distress signal includes a facial image of the consumer at the emergency event. Notably, the real time output distress signal includes the non-public personal consumer information only if the consumer granted the financial institution permission to share the non-public personal consumer information before occurrence of the emergency event.

The consumer permission determining mechanism may include a financial institution database adapted to be housed at the financial institution. Such a financial institution database preferably contains a list of all consumers having bank accounts at the financial institution and who have granted the financial institution permission to share the non-public personal consumer information with the policing authority during the emergency event. Such a consumer permission determining mechanism may further include a dedicated communication link communicatively connecting the housing to the financial institution database.

The controller preferably includes a processor and a memory electrically coupled to the processor. Such a memory includes a software program executing a programmable control logic algorithm for causing the capturing and transmitting mechanism to identify when the emergency event is occurring such that the routing mechanism automatically communicates the captured emergency event to the policing authority after the emergency event is transmitted to the backup server.

In one embodiment, the software program may include the steps of: (a.) verifying an emergency pin code; (b.) upon verifying the emergency pin code, requesting the consumer to press one of a continue button and a cancel button (which are located on the distress signal interface 33) based on whether the consumer believes the emergency event is occurring and not occurring respectively; (c.) if the continue button is pressed, generating and transmitting a control signal to stamp the date, time and location of the emergency event as well as to capture the facial image of the consumer; and (d.) if the cancel button is pressed, restarting a money withdrawal transaction process at the ATM.

In one embodiment, the distress output signal preferably includes: a first embedded data stream including a time stamp of the emergency event, a second embedded data stream including a date stamp of the emergency event, a third embedded data stream including a location stamp of the emergency event, and a fourth embedded data stream including the facial image of the consumer. In this manner, the first, second, third and fourth embedded data streams provide real-time documentation of the emergency event directly to the policing authority.

In one embodiment, step c. further comprises the steps of: querying the financial institution for a record of the consumer based upon the verified emergency pin code associated with the consumer; determining whether the record states the consumer authorized release of the non-public personal consumer information to the policing authority; and if the consumer authorized release of the non-public personal consumer information to the policing authority, then generating a fifth embedded data stream containing the non-public personal consumer information.

In one embodiment, the distress output signal may further include the fifth embedded data stream.

In one embodiment, the backup server may include a digital video recorder capable of formatting and playing back the first, second, third, fourth and fifth embedded data streams during pre-emergency and post-emergency event time frames. For example, the DVR is a tapeless drive that receives and playbacks digital data signals. An important benefit of a DVR is the unprecedented control over playback. With a VCR, you have to wait for it to finish recording before you can start reviewing it. Since there is no tape to rewind, digital recording does not have this limitation. Any prerecorded audio/video data that started recording 30 minutes to 1 hour ago, for example, can be viewed at any time, even while it is still recording from that point in time. A DVR generally keeps the past hour or so in the buffer (in memory). This means that if you walk into the room 30 minutes to 1 hour after a recording has started, you can rewind it and watch the beginning of the recording.

In one embodiment, the distress output signal may include an audio message audibly communicating the time, date and location stamps to the policing authority. In this manner, the non-public personal consumer information is audibly transmitted to the policing authority.

In one embodiment, a method of utilizing an ATM security system is further provided for alerting a policing authority of a emergency event occurring at the ATM while ensuring preservation of non-public personal consumer information involved in the emergency event. Such a method preferably includes the chronological steps of: providing a housing including a controller disposed therein; residing the housing at the ATM; providing and communicating a backup server with the controller; providing a mechanism for capturing and transmitting an occurrence of the emergency event to the backup server; and disposing the capturing and transmitting mechanism within the housing.

Such a method may further include the chronological steps of: providing and locating a policing authority from the housing; providing a mechanism for determining whether a consumer granted permission to a financial institution to share the non-public personal consumer information with the policing authority upon detection of the emergency event; and providing a mechanism for routing a real time output distress signal to the policing authority upon capturing the emergency event in such a manner that the policing authority receives a location, a date and a time of the emergency event. In this manner, the real time output distress signal preferably includes a facial image of the consumer at the emergency event. Notably, the real time output distress signal further includes the non-public personal consumer information only if the consumer granted the financial institution permission to share the non-public personal consumer information before occurrence of the emergency event.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
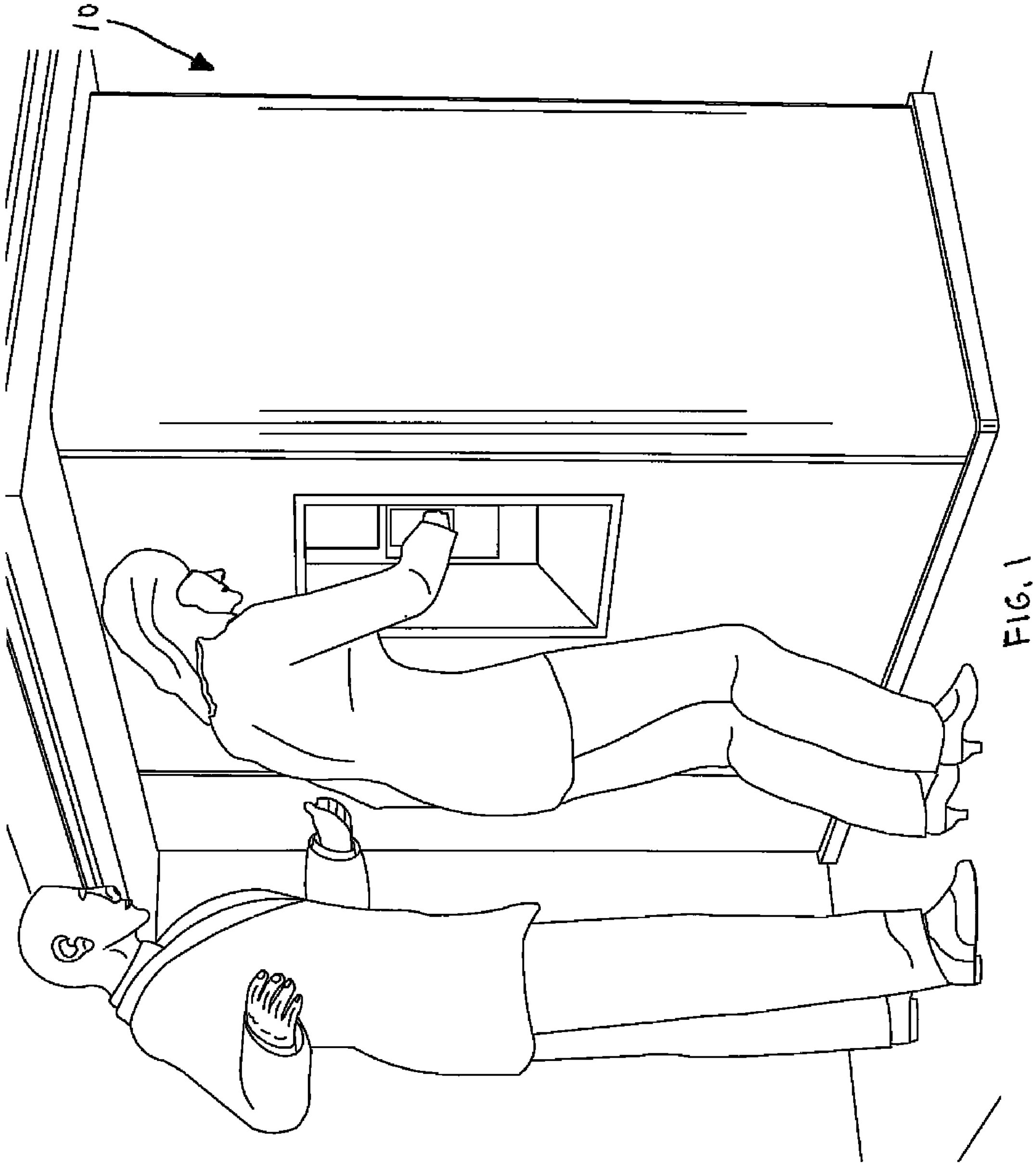
FIG. 1 is a perspective view showing an exemplary embodiment of a victim discreetly alerting the police of a robbery situation via the ATM security system, in accordance with one embodiment of the present invention.
Figure 2:
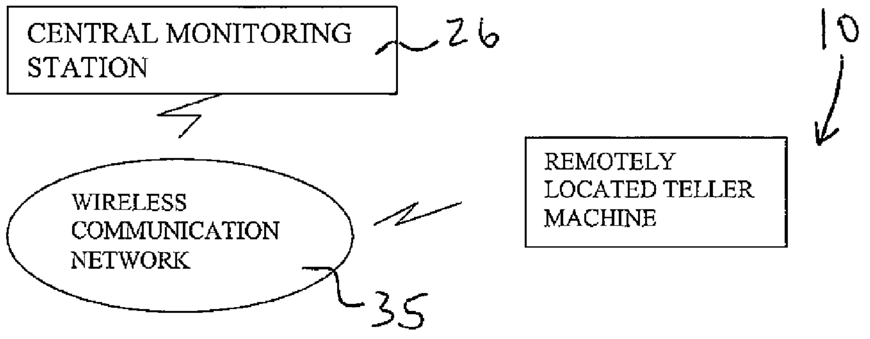
FIG. 2 is a high-level schematic block diagram showing the interrelationship between the major electronic components of the ATM security system shown in FIG. 1.
Figure 2:
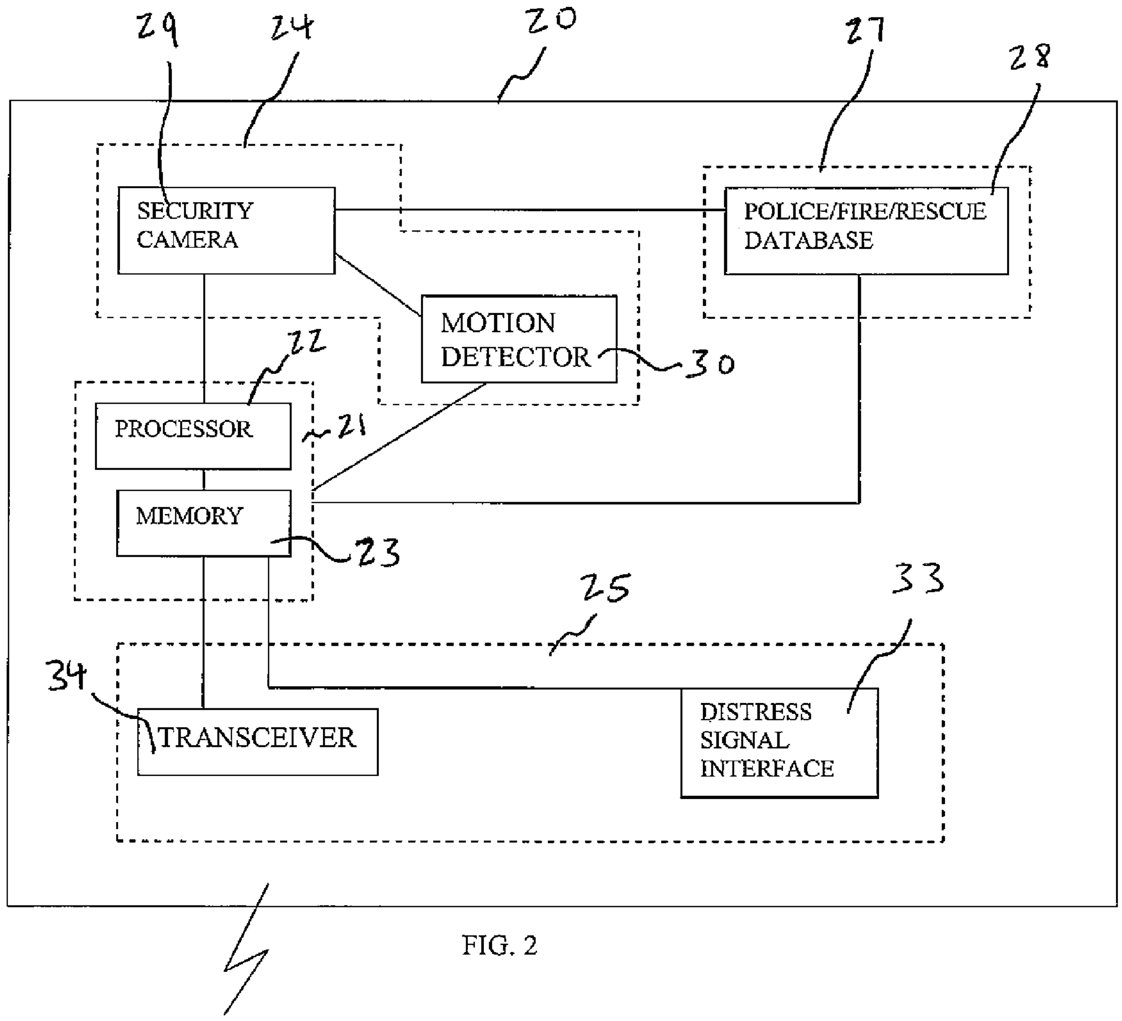
Figure 3:
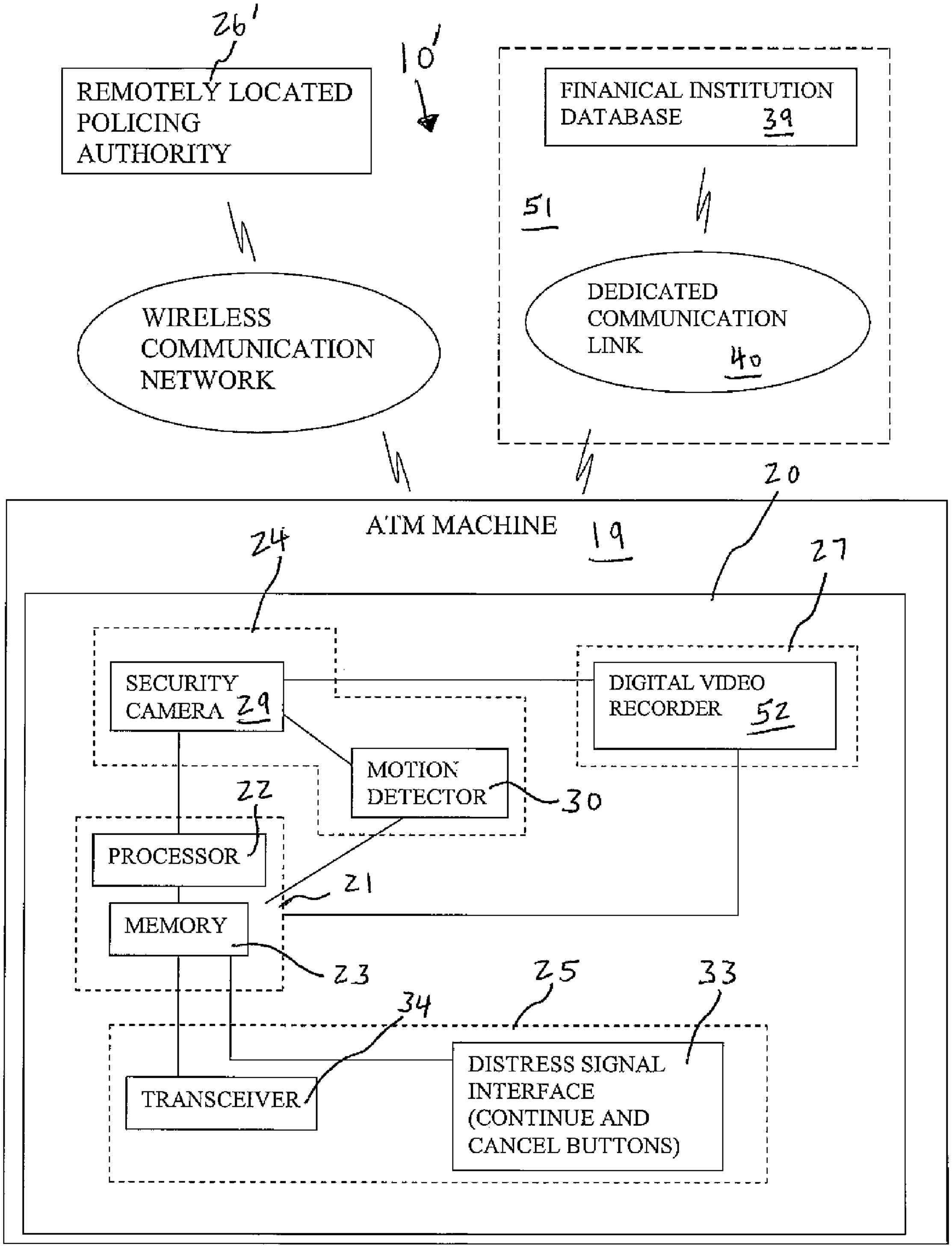
FIG. 3 is a high-level schematic block diagram showing the interrelationship between the major electronic components of another embodiment of the ATM security system wherein an emphasis is placed on the preservation of non-public personal consumer information during automatic notification of the emergency event to the policing authority.

The system of this invention is referred to generally in FIGS. 1-3 by the reference numeral 10 and is intended to protect an ATM security system. It should be understood that the apparatus 10 may be used to protect many different types of banking services and should not be limited in use with only those banking services mentioned herein.

Referring initially to FIGS. 1-2, the automatic teller machine (ATM) comprises a housing 20 for containing numerous elements needed for the operation of the ATM. Such housing 20 may be located within a building wall structure or may be free standing. The ATM wall may be heavy gauge metal or plastic. Within the housing 20 there are typically an interface electronic circuitry and associated devices for communicating with a consumer and with a remote central computer (not shown) usually located at a Bank branch or central office. Such communication with such central computer is most often through a telephone line and modem arrangement, for example.

Still within the housing 20 there is located at least one cash box. The cash boxes are preferably not integral to a particular ATM, but are removable and replaceable so that empty cash boxes are removed and replaced with filled cash boxes during servicing of the ATM without need for handling loose cash during the servicing process. The cash boxes are designed to co-operate with a cash dispensing mechanism for dispensing cash to a customer using the ATM after a predetermined sequence of events, such as insertion of an ID card, proper identification of the customer, verification of the customer's credit, etc. Some of these functions occur locally in the ATM, whereas others are performed by the central computer.

Most ATMs further include a number of sensors. Such sensors usually provide signals indicative of certain predetermined "emergency" conditions, including but not limited to smoke, heat, seismic motion, tilting beyond an acceptable amount, movement, and the like. The sensors communicate the alarm condition to the bank central computer for further action. Exemplary identification methods include, but are not limited to, PIN numbers, iris scans, thumb prints and facial scans.

The ATM comprises a distress interface panel 33 to allow a user to interact with the terminal during a transaction. The distress interface panel 33 includes a card reader slot for insertion of user identification card bearing encoded user data at the commencement of a transaction, a key pad and additional key buttons for entering information during a transaction, a cash dispenser slot for delivery of currency notes stored within the ATM to a customer in a cash withdrawal transaction, a display for displaying information to the customer during a transaction, a deposit slot for receiving deposit envelopes containing cash or checks during a deposit transaction, and a receipt printer slot for delivery of a receipt to a customer at the end of a transaction.

With reference to FIG. 2, the ATM further comprises a controller 21 which communicates with components of the distress interface panel 33. The controller 21 includes a processor 22 and a memory 23 connected, via a bus line to the processor 22. The processor 22 receives signals from the key pad and from various mechanisms of the card reader and depository modules, and provides output signals to the display, the receipt printer, the cash dispenser module and to various mechanisms of the card reader module. It should be understood that the processor 22 controls the amount of cash dispensed by the cash dispenser, the information displayed on the display and the information printed by the receipt printer. The processor 22 may include a microcomputer, and the memory 23 may be a non-volatile RAM. The structure and operation of such microcomputer and memory 23 are well known and therefore will not be described.

Referring to FIGS. 1 and 2, as noted above, the ATM security system 10 includes a housing 20 with a controller 21 disposed therein. Such a controller 21 includes a processor 22 and a memory 23 electrically coupled to processor 22. Such a memory 23 includes a software program executing a programmable control logic algorithm for causing the capturing and transmitting mechanism 24 to identify when the emergency event is occurring which is essential such that the routing mechanism 25 automatically communicates the captured emergency event to the central monitoring station 26 after the emergency event is transmitted to the backup server 27. The memory 23 is designed for recognizing specific emergency codes that may be inputted by a user during emergency situations.

In one embodiment, the software program includes the steps of: determining whether the consumer has entered a predetermined emergency pin code, if no, requesting the consumer to enter a predetermined emergency pin code; if yes, requesting the consumer to press a cancel button followed by entering the predetermined emergency pin code; validating the predetermined emergency pin code; and generating and transmitting a control signal to stamp the date, time and location of the emergency event. The software program is designed for enabling a user to enter an emergency pin code either before or after entering an account pin code.

Referring again to FIGS. 1 and 2, the system further includes a backup server 27 in direct communication with the controller 21. Such a backup server 27 may include a policing authority database 28 in communication with the security camera 29. The system further includes a mechanism 24 for capturing and transmitting an occurrence of the emergency event to the backup server 27. Such a capturing and transmitting mechanism 24 is disposed within the housing 20 and includes a security camera 29 disposed within the housing 20 and positioned in such a manner that an image of the consumer and a surrounding periphery of the consumer is captured during a transaction at the housing 20 and at least one sensor 30 electrically coupled to the controller 21 and the security camera 29 for detecting a presence of the consumer at the housing 20. The controller 21 is electrically coupled to the security camera 29 for adjusting an operating mode of the security camera 29. The camera 29 is automatically activated upon entry of an emergency pin code by a user and thereby begins recording the robbery in order to enhance evidence for later police apprehension of the perpetrator.

Referring again to FIGS. 1 and 2, the system 10 further includes a remotely located central monitoring station 26 in communication with the controller 21 and the capturing and transmitting mechanism 24 and a mechanism 25 for wirelessly routing a real time output distress signal to the central monitoring station 26 upon capturing the emergency event in such a manner that the central monitoring station 26 receives a location, a date and a time of the emergency event. Upon activation of the system 10, the central monitoring station 26, usually a police station, will receive a real time message indicating that a robbery is occurring at the specified location.

The real time output distress signal routing mechanism 25 includes a distress interface panel 33 electrically coupled to the controller 21 and attached to the housing 20. Such a distress interface panel 33 generates a distress output signal based upon receipt of a user input. The mechanism further includes a transceiver 34 electrically coupled to the controller 21 for transmitting the distress output signal based upon detection of the emergency event and a wireless communication network 35 for routing the distress output signal from the housing 20 to the central monitoring station 26.

Referring again to FIGS. 1 and 2, the distress output signal includes a first embedded data stream including a time stamp of the emergency event, a second embedded data stream including a date stamp of the emergency event, and a third embedded data stream including a location stamp of the emergency event. Such first, second and third embedded data streams provide a real-time documentation of the emergency event. The message conveyed to the central monitoring station will include the time, date, and location of the emergency event as it is taking place.

Thus, the ATM security system provides the unexpected and unpredictable benefit of enabling a user to discreetly inform the police of a robbery situation. By enabling a user to enter a special emergency code that automatically sends a real time message to a local police station, a user may alert the police while still cooperating with the robber, thereby ensuring a user's safety. In addition, the camera ensures that all evidence is preserved; therefore, later apprehension and prosecution of the criminal will be uninhibited. Such benefits overcome the prior art shortcomings.

In use, a method for alerting a policing authority of a emergency event occurring at an ATM includes the steps of: providing a housing 20 including a controller 21 disposed therein; providing a backup server 27 in direct communication with the controller 21; providing a remotely located central monitoring station 26 in communication with the controller 21; capturing and transmitting an occurrence of the emergency event to the backup server 27; and wirelessly routing a real time output distress signal to the central monitoring station 26 upon capturing the emergency event in such a manner that the central monitoring station 26 receives a location, a date and a time of the emergency event.

In use, the method further includes the steps of: providing a processor 22; and providing a memory 23 electrically coupled to the processor 22. Such a memory 23 includes a software program executing a programmable control logic algorithm for causing the capturing and transmitting mechanism 24 to identify when the emergency event is occurring such that the routing mechanism 25 automatically communicates the captured emergency event to the central monitoring station 26 after the emergency event is transmitted to the backup server 27.

In use, the software program including the steps of: determining whether the consumer has entered an account pin code, if no, requesting the consumer to enter a predetermined emergency pin code; if yes, requesting the consumer to press a cancel button followed by entering the predetermined emergency pin code; validating the predetermined emergency pin code; and generating and transmitting a control signal to stamp the date, time and location of the emergency event.

In use, the method further includes the steps of: providing a distress interface panel 33 electrically coupled to the controller 21 and attached to the housing 20, the distress interface panel 33 generating a distress output signal based upon receipt of a user input; providing a transceiver 34 electrically coupled to the controller 21 for transmitting the distress output signal based upon detection of the emergency event; and providing a wireless communication network 35 for routing the distress output signal from the housing 20 to the central monitoring station 26.

In use, the method further includes the steps of: providing a security camera 29 disposed within the housing 20 and positioned in such a manner that an image of the consumer and a surrounding periphery of the consumer is captured during a transaction at the housing 20; and providing at least one sensor 30 electrically coupled to the controller 21 and the security camera 29 for detecting a presence of the consumer at the housing 20. The controller 21 is electrically coupled to the security camera 29 for adjusting an operating mode of the security camera 29.

In use, the method further includes the step of generating the distress output signal, which includes the steps of: providing a first embedded data stream including a time stamp of the emergency event; providing a second embedded data stream including a date stamp of the emergency event; and providing a third embedded data stream including a location stamp of the emergency event; wherein the first, second and third embedded data streams provide a real-time documentation of the emergency event. The method further includes the step of: providing a policing authority database 28 in communication with the security camera 29.

In an exemplary embodiment, a user accesses the POS/ATM to withdraw funds from the machine. There are three situations that may occur when a customer is compromised while inputting their information into a machine: the customer pin number has not been inputted; the customer pin number has been entered; or the customer is told to give up a certain amount of funds which requires them to re-enter their pin number back into the system. The present invention may be used during each of these situations.

When a customer is compromised but has not yet inputted their pin number, and then they are forced to input their pin number, the customer should instead enter their distress pin code, which is an alternative from the correct pin code that was setup on the account.

When a customer is compromised during a transaction, and they have already entered their pin number, they may be forced for money after their pin code is entered, thus bypassing the distress pin code. However, it is often the first reaction of a customer, after they have been compromised, to hit the Cancel key on the pad. In turn, this restarts the whole process, enabling the customer to re-enter their distress pin number, thereby activating the system.

When a customer is told to give up a certain amount of funds, thereby requiring them to re-enter their pin number back into the system, the customer will be able to once again re-enter the distress pin code, thereby activating the system.

The distress pin code that is entered will activate the software that will trigger the equipment that will gather the time/date stamped media that will be backed up on the server and transferred to the police station or other destinations. Communication between the system and the police station, bank, and backup server would be via the regular leased line, wireless connection, or CDMA & GSM portable connection.

Once the information is transmitted out and received at its selected destinations, the company can then review the incident and manage the situation in a professional and timely manner with little or no investigation. The system is built to send time-stamped media, and in comparison to call for services (CFS) where the accuracy is stated 90 percent for portrayal of criminal activity, the present system would make accuracy percentage rise to above 97 percent. The rise is due to the time/date-stamped media which would take the thoroughness of the system one step further. All the information needed for the investigation would immediately be provided.

The system will cover all the bases required during criminal investigation: understanding what happened in the situation; providing evidence on what happened during the incident; evaluating the options on how to prevent the situation from happening again; and also making sure that everyone is insured and trusted by everyone else. If a company can insure a bank on the money that is stolen based on a verbal report, this system should make it even more efficient given that numerous variables can be cut down from trying to figure out what actually happened versus what could have happened.

In another embodiment, the ATM security system 10' not only alerts a policing authority 26' of a emergency event occurring at the ATM 19 but such a security system 10' also ensures preservation of a consumer's non-public personal information involved in the emergency event at the ATM 19.

As perhaps best shown in FIG. 3, another embodiment of the present invention may include an ATM security system 10' preferably including a housing 20 including a controller 21 disposed therein. Such a housing 20 is preferably adapted to reside at the ATM 19. A backup server 27 is preferably in communication with the controller 21. A mechanism 24 is provided for capturing and transmitting an occurrence of the emergency event to the backup server 27. Such a capturing and transmitting mechanism 24 may be disposed within the housing 20. A policing authority 26' may be remotely located from the housing 20 and another mechanism 51 is provided for determining whether a consumer granted permission to a financial institution to share the non-public personal consumer information with the policing authority 26' upon detection of the emergency event.

The ATM security system 10' may further include yet another mechanism 25 for routing a real time output distress signal to the policing authority 26' upon capturing the emergency event in such a manner that the policing authority 26' receives a location, a date and a time of the emergency event. Such a real time output distress signal includes a facial image of the consumer at the emergency event. Notably, the real time output distress signal includes the non-public personal consumer information only if the consumer granted the financial institution permission to share the non-public personal consumer information before occurrence of the emergency event.

The consumer permission determining mechanism 51 may include a financial institution database 39 adapted to be housed at the financial institution. Such a financial institution database 39 preferably contains a list of all consumers having bank accounts at the financial institution and who have granted the financial institution permission to share their non-public personal consumer information with the policing authority 26' during the emergency event. Such a consumer permission determining mechanism 51 may further include a dedicated communication link 40 communicatively connecting the housing 20 to the financial institution database 39.

The controller 21 preferably includes a processor 22 and a memory 23 electrically coupled to the processor 22. Such a memory 23 includes a software program executing a programmable control logic algorithm for causing the capturing and transmitting mechanism 24 to identify when the emergency event is occurring such that the routing mechanism 25 automatically communicates the captured emergency event to the policing authority 26' after the emergency event is transmitted to the backup server 27.

In one embodiment, the software program may include the steps of: (a.) verifying an emergency pin code; (b.) upon verifying the emergency pin code, requesting the consumer to press one of a continue button and a cancel button (which are located on the distress signal interface 33) based on whether the consumer believes the emergency event is occurring and not occurring respectively; (c.) if the continue button is pressed, generating and transmitting a control signal to stamp the date, time and location of the emergency event as well as to capture the facial image of the consumer; and (d.) if the cancel button is pressed, restarting a money withdrawal transaction process at the ATM 19.

In one embodiment, the distress output signal preferably includes: a first embedded data stream including a time stamp of the emergency event, a second embedded data stream including a date stamp of the emergency event, a third embedded data stream including a location stamp of the emergency event, and a fourth embedded data stream including the facial image of the consumer. In this manner, the first, second, third and fourth embedded data streams provide real-time documentation of the emergency event directly to the policing authority 26'.

In one embodiment, step c. further comprises the steps of: querying the financial institution database 39 for a record of the consumer based upon the verified emergency pin code associated with the consumer; determining whether the record states the consumer authorized release of the non-public personal consumer information to the policing authority 26'; and if the consumer authorized release of the non-public personal consumer information to the policing authority 26', then generating a fifth embedded data stream containing the non-public personal consumer information.

In one embodiment, the distress output signal may further include the fifth embedded data stream.

In one embodiment, the backup server 27 may include a digital video recorder 52 capable of formatting and playing back the first, second, third, fourth and fifth embedded data streams during pre-emergency and post-emergency event time frames. For example, the DVR is a tapeless drive that receives and playbacks digital data signals. An important benefit of a DVR is the unprecedented control over playback. With a VCR, you have to wait for it to finish recording before you can start reviewing it. Since there is no tape to rewind, digital recording does not have this limitation. Any prerecorded audio/video data that started recording 30 minutes to 1 hour ago, for example, can be viewed at any time, even while it is still recording from that point in time. A DVR generally keeps the past hour or so in the buffer (in memory). This means that if you walk into the room 30 minutes to 1 hour after a recording has started, you can rewind it and watch the beginning of the recording.

In one embodiment, the distress output signal may include a prerecorded audio message audibly communicating the time, date and location stamps to the policing authority 26'. In this manner, the non-public personal consumer information is audibly transmitted to the policing authority 26'.

In one embodiment, a method of utilizing an ATM security system 10' is further provided for alerting a policing authority 26' of an emergency event occurring at the ATM 19 while ensuring preservation of non-public personal consumer information involved in the emergency event. Such a method preferably includes the chronological steps of: providing a housing 20 including a controller 21 disposed therein; residing the housing 20 at the ATM 19; providing and communicating a backup server 27 with the controller 21; providing a mechanism 24 for capturing and transmitting an occurrence of the emergency event to the backup server 27; and disposing the capturing and transmitting mechanism 24 within the housing 20.

Such a method may further include the chronological steps of: providing and locating a policing authority 26' from the housing 20; providing a mechanism 51 for determining whether a consumer granted permission to a financial institution to share the non-public personal consumer information with the policing authority 26' upon detection of the emergency event; and providing a mechanism 25 for routing a real time output distress signal to the policing authority 26' upon capturing the emergency event in such a manner that the policing authority 26' receives a location, a date and a time of the emergency event. In this manner, the real time output distress signal preferably includes a facial image of the consumer at the emergency event. Notably, the real time output distress signal further includes the non-public personal consumer information only if the consumer granted the financial institution permission to share the non-public personal consumer information before occurrence of the emergency event.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. An ATM security system for alerting a policing authority of an emergency event occurring at the ATM while ensuring preservation of non-public personal consumer information involved in the emergency event, the ATM security system comprising:

a housing including a controller disposed therein;

a backup server in communication with the controller;

means for capturing and transmitting an occurrence of the emergency event to the backup server;

a policing authority remotely located from the housing;

means for determining whether a consumer granted permission to a financial institution to share the non-public personal consumer information with the policing authority upon detection of the emergency event;

means for routing a real time output distress signal to the policing authority upon capturing the emergency event in such a manner that the policing authority receives a location, a date and a time of the emergency event;

wherein the real time output distress signal includes a facial image of the consumer at the emergency event;

wherein the real time output distress signal further includes the non-public personal consumer information only if the consumer granted the financial institution permission to share the non-public personal consumer information before occurrence of the emergency event;

wherein the consumer permission determining means comprises:

a financial institution database adapted to be housed at the financial institution, said financial institution database containing a list of all consumers having bank accounts at the financial institution and who have granted the financial institution permission to share the non-public personal consumer information with the policing authority during the emergency event; and a dedicated communication link communicatively connecting the housing to the financial institution database;

wherein the controller comprises:

a processor; and a memory electrically coupled to the processor, the memory including a software program executing a programmable control logic algorithm for causing the capturing and transmitting means to identify when the emergency event is occurring such that the routing means automatically communicates the captured emergency event to the policing authority after the emergency event is transmitted to the backup server, the software program including the steps of:

a. verifying an emergency pin code;

b. upon verifying the emergency pin code, requesting the consumer to press one of a continue button and a cancel button based on whether the consumer believes the emergency event is occurring and not occurring respectively;

c. if the continue button is pressed, generating and transmitting a control signal to stamp the date, time and location of the emergency event as well as to capture the facial image of the consumer; and d. if the cancel button is pressed, restarting a money withdrawal transaction process at the ATM;

wherein the distress output signal comprises:

a first embedded data stream comprising a time stamp of the emergency event;

a second embedded data stream comprising a date stamp of the emergency event;

a third embedded data stream comprising a location stamp of the emergency event; and a fourth embedded data stream comprising the facial image of the consumer;

wherein the first, second, third and fourth embedded data streams provide real-time documentation of the emergency event directly to the policing authority;

wherein step c. further comprises the steps of:

querying said financial institution database for a record of the consumer based upon the verified emergency pin code associated with the consumer;

determining whether said record states the consumer authorized release of the non-public personal consumer information to the policing authority; and if the consumer authorized release of the non-public personal consumer information to the policing authority, then generating a fifth embedded data stream containing the non-public personal consumer information.

2. The ATM security system of claim 1, wherein distress output signal further comprises: the fifth embedded data stream.

3. The ATM security system of claim 2, wherein the backup server comprises:

a digital video recorder capable of formatting and playing back the first, second, third, fourth and fifth embedded data streams during pre-emergency and post-emergency event time frames.

4. The ATM security system of claim 3, wherein the distress output signal comprises: an audio message audibly communicating the time, date and location stamps to the policing authority, wherein the non-public personal consumer information is audibly transmitted to the policing authority.

5. An ATM security system for alerting a policing authority of an emergency event occurring at the ATM while ensuring preservation of non-public personal consumer information involved in the emergency event, the ATM security system comprising:

a housing including a controller disposed therein, the housing being adapted to reside at the ATM;

a backup server in communication with the controller;

means for capturing and transmitting an occurrence of the emergency event to the backup server, the capturing and transmitting means being disposed within the housing;

a policing authority remotely located from the housing;

means for determining whether a consumer granted permission to a financial institution to share the non-public personal consumer information with the policing authority upon detection of the emergency event;

means for routing a real time output distress signal to the policing authority upon capturing the emergency event in such a manner that the policing authority receives a location, a date and a time of the emergency event;

wherein the real time output distress signal includes a facial image of the consumer at the emergency event;

wherein the real time output distress signal further includes the non-public personal consumer information only if the consumer granted the financial institution permission to share the non-public personal consumer information before occurrence of the emergency event;

wherein the consumer permission determining means comprises:

a financial institution database adapted to be housed at the financial institution, said financial institution database containing a list of all consumers having bank accounts at the financial institution and who have granted the financial institution permission to share the non-public personal consumer information with the policing authority during the emergency event; and a dedicated communication link communicatively connecting said housing to said financial institution database;

wherein the controller comprises:

a processor; and a memory electrically coupled to the processor, the memory including a software program executing a programmable control logic algorithm for causing the capturing and transmitting means to identify when the emergency event is occurring such that the routing means automatically communicates the captured emergency event to the policing authority after the emergency event is transmitted to the backup server, the software program including the steps of:

a. verifying an emergency pin code;

b. upon verifying the emergency pin code, requesting the consumer to press one of a continue button and a cancel button based on whether the consumer believes the emergency event is occurring and not occurring respectively;

c. if the continue button is pressed, generating and transmitting a control signal to stamp the date, time and location of the emergency event as well as to capture the facial image of the consumer; and d. if the cancel button is pressed, restarting a money withdrawal transaction process at the ATM;

wherein the distress output signal comprises:

a first embedded data stream comprising a time stamp of the emergency event;

a second embedded data stream comprising a date stamp of the emergency event;

a third embedded data stream comprising a location stamp of the emergency event; and a fourth embedded data stream comprising the facial image of the consumer;

wherein the first, second, third and fourth embedded data streams provide real-time documentation of the emergency event directly to the policing authority;

wherein step c. further comprises the steps of:

querying said financial institution database for a record of the consumer based upon the verified emergency pin code associated with the consumer;

determining whether said record states the consumer authorized release of the non-public personal consumer information to the policing authority; and if the consumer authorized release of the non-public personal consumer information to the policing authority, then generating a fifth embedded data stream containing the non-public personal consumer information.

6. The ATM security system of claim 5, wherein distress output signal further comprises: the fifth embedded data stream.

7. The ATM security system of claim 6, wherein the backup server comprises:

a digital video recorder capable of formatting and playing back the first, second, third, fourth and fifth embedded data streams during pre-emergency post-emergency event time frames.

8. The ATM security system of claim 7, wherein the distress output signal comprises: an audio message audibly communicating the time, date and location stamps to the policing authority, wherein the non-public personal consumer information is audibly transmitted to the policing authority.

* * * * *